United States Patent
Sato et al.

(10) Patent No.: US 11,521,364 B2
(45) Date of Patent: Dec. 6, 2022

(54) DETERMINATION METHOD, DETERMINATION APPARATUS, AND COMPUTER READABLE MEDIUM STORING DETERMINATION PROGRAM

(71) Applicant: TOYOTA JIDOSHA KABUSHIKI KAISHA, Toyota (JP)

(72) Inventors: Hikari Sato, Toyota (JP); Tooru Fukuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 17/143,592

(22) Filed: Jan. 7, 2021

(65) Prior Publication Data
US 2021/0248405 A1  Aug. 12, 2021

(30) Foreign Application Priority Data
Feb. 7, 2020  (JP) .............................. JP2020-019885

(51) Int. Cl.
*G06V 10/14* (2022.01)
*G06V 10/145* (2022.01)
*G06K 9/62* (2022.01)
*G06V 20/64* (2022.01)

(52) U.S. Cl.
CPC ......... *G06V 10/145* (2022.01); *G06K 9/6256* (2013.01); *G06V 20/64* (2022.01)

(58) Field of Classification Search
CPC ...... G06V 10/145; G06V 20/64; G06V 10/50; G06V 10/60; G06K 9/6256; H04N 1/60; H04N 1/46; G01J 3/51; G01N 21/27
USPC ....................................................... 382/154
See application file for complete search history.

(56) References Cited

U.S. PATENT DOCUMENTS

2017/0344850 A1* 11/2017 Kobori ................. G06V 20/64
2021/0027453 A1*  1/2021 Lin ....................... G06T 5/003

FOREIGN PATENT DOCUMENTS

JP         2019-078623 A    5/2019

* cited by examiner

*Primary Examiner* — Neil R McLean
(74) *Attorney, Agent, or Firm* — Sughrue Mion, PLLC (57) ABSTRACT

A determination method according to an example aspect of the present disclosure includes: acquiring a plurality of captured images of an object successively captured by an image capturing apparatus in a state in which a positional relation between the object and the image capturing apparatus is changing; dividing each of the plurality of captured images that are continuous in time into a plurality of image areas; associating the plurality of divided image areas among the plurality of captured images that are continuous in time; calculating a luminance difference between a maximum luminance value and a minimum luminance value in each of the image areas that have been associated; and determining the type of the paint applied to the object based on changes in the luminance differences in the plurality of image areas associated among the plurality of captured images that are continuous in time.

10 Claims, 6 Drawing Sheets

DETERMINATION METHOD, DETERMINATION APPARATUS, AND COMPUTER READABLE MEDIUM STORING DETERMINATION PROGRAM

CROSS REFERENCE TO RELATED APPLICATIONS

This application is based upon and claims the benefit of priority from Japanese patent application No. 2020-019885, filed on Feb. 7, 2020, the disclosure of which is incorporated herein in its entirety by reference.

BACKGROUND

The present disclosure relates to a determination method, a determination apparatus, and a computer readable medium storing a determination program for determining the type of paint applied to an object.

Techniques for determining the type of the paint applied to the object, for example, techniques for determining if the paint is paint mixed with a light reflective material or paint in which the light reflective material is not mixed have been proposed. As one example of this technique, a paint color evaluation apparatus disclosed in Japanese Patent No. 6328838 irradiates a painted surface with collimated light, calculates, for captured images of the painted surface, an average value of the luminance of a low luminance region and an average value of the luminance of a high luminance region, and evaluates the color of the paint on the painted surface based on these average values.

SUMMARY

However, the paint color evaluation apparatus disclosed in Japanese Patent No. 6328838 captures images of the painted surface of the object arranged in a predetermined position using a plurality of image capturing apparatuses whose capturing positions and directions are fixed, and then evaluates the color of the paint of the painted surface. Therefore, there is a problem that this paint color evaluation apparatus can only determine the type of the paint in a local range of the object to be determined and it is impossible to determine the type of the paint applied to a wide range of the object.

The present disclosure has been made in order to solve the aforementioned problem and aims to provide a determination method, a determination apparatus, and a computer readable medium storing a determination program capable of determining the type of paint applied to a wide range of the object to be determined.

An example aspect of the present disclosure is a determination method according to an example aspect of the present disclosure including:

acquiring a plurality of captured images of an object successively captured by an image capturing apparatus in a state in which a positional relation between the object and the image capturing apparatus is changing;

dividing each of the plurality of captured images that are continuous in time into a plurality of image areas;

associating the plurality of divided image areas among the plurality of captured images that are continuous in time;

calculating a luminance difference between a maximum luminance value and a minimum luminance value in each of the image areas that have been associated; and determining the type of the paint applied to the object based on changes in the luminance differences in the plurality of image areas associated among the plurality of captured images that are continuous in time.

Further, the type of the paint includes paint mixed with a light reflective material and paint in which the light reflective material is not mixed, and it may be determined, in the determination of the type of the paint, whether the paint applied to the object is the paint mixed with the light reflective material or the paint in which the light reflective material is not mixed.

Further, the determination of the type of the paint is performed using a trained model, the trained model performs learning using, as training data, information indicating the luminance differences in respective image areas associated among the plurality of captured images that are continuous in time and information indicating the type of the paint applied to the object expressed in the image areas, and the trained model may determine the type of the paint applied to the object using the information indicating the luminance differences of the associated plurality of image areas.

Further, in the determination of the type of the paint, it may be determined that the paint applied to the object is the paint mixed with the light reflective material when the changes in the luminance differences are equal to or larger than a predetermined threshold, and it may be determined that the paint applied to the object is the paint in which the light reflective material is not mixed when the changes in the luminance differences are smaller than the predetermined threshold.

An example aspect of the present disclosure is a determination apparatus according to an example aspect of the present disclosure including:

a dividing unit configured to divide each of a plurality of captured images of the object that have been successively captured by an image capturing apparatus in a state in which the positional relation between the object and the image capturing apparatus is changing into a plurality of image areas;

an associating unit configured to associate the plurality of divided image areas between the plurality of captured images that are continuous in time;

a luminance difference calculation unit configured to calculate a luminance difference among a maximum luminance value and a minimum luminance value in each of the image areas that have been associated; and a determination unit configured to determine the type of the paint applied to the object based on changes in the luminance differences in the plurality of image areas associated among the plurality of captured images that are continuous in time.

Further, the type of the paint includes paint mixed with a light reflective material and paint in which the light reflective material is not mixed, and the determination unit may determine whether the paint applied to the object is the paint mixed with the light reflective material or the paint in which the light reflective material is not mixed.

Further, the determination unit is a trained model that performs learning using, as training data, information indicating the luminance differences in respective image areas associated among the plurality of captured images that are continuous in time and information indicating the type of the paint applied to the object expressed in the image areas, and the trained model may determine the type of the paint applied to the object using the information indicating the luminance differences of the associated plurality of image areas.

Further, the determination unit may determine that the paint applied to the object is the paint mixed with the light reflective material when the changes in the luminance differences are equal to or larger than a predetermined threshold, and the determination unit may determine that the paint applied to the object is the paint in which the light reflective material is not mixed when the changes in the luminance differences are smaller than the predetermined threshold.

An example aspect of the present disclosure is a computer readable medium storing a determination program for determining the type of paint applied to an object, the program causing a computer to execute the following steps of:

acquiring a plurality of captured images of the object successively captured by an image capturing apparatus in a state in which a positional relation between the object and the image capturing apparatus is changing;

dividing each of the plurality of captured images that are continuous in time into a plurality of image areas; associating the plurality of divided image areas among the plurality of captured images that are continuous in time;

calculating a luminance difference between a maximum luminance value and a minimum luminance value in each of the image areas that have been associated; and determining the type of the paint applied to the object based on changes in the luminance differences in the plurality of image areas associated among the plurality of captured images that are continuous in time.

Further, the type of the paint includes paint mixed with a light reflective material and paint in which the light reflective material is not mixed, and the step of determining the type of the paint includes a step of determining whether the paint applied to the object is the paint mixed with the light reflective material or the paint in which the light reflective material is not mixed.

According to the present disclosure, it is possible to provide a determination method, a determination apparatus, and a computer readable medium storing a determination program capable of determining the type of paint applied to a wide range of the object to be determined.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
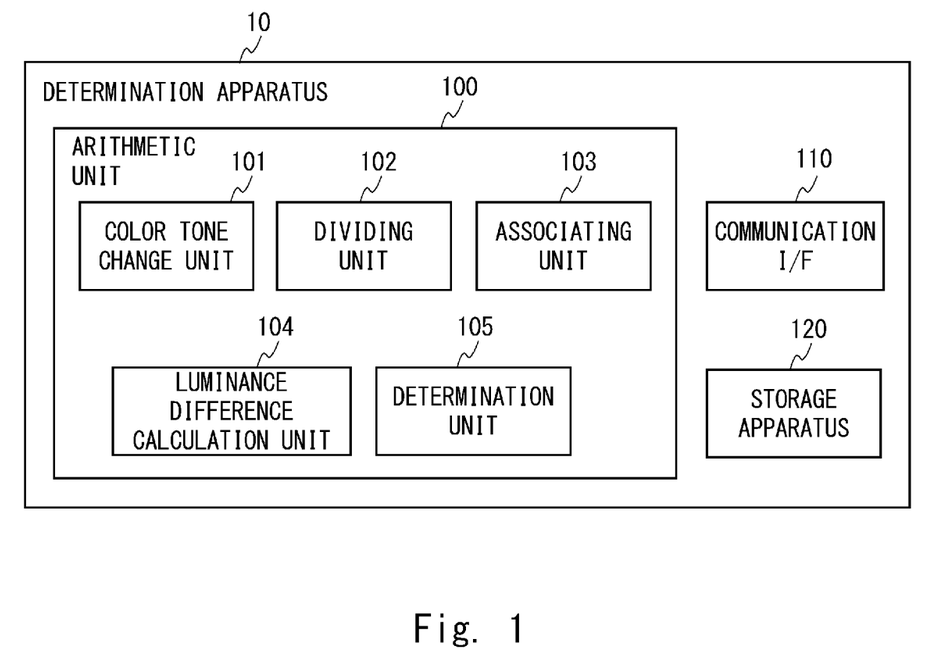
FIG. 1 is a block diagram showing a configuration of a determination apparatus according to an example aspect of the present disclosure.

Hereinafter, with reference to the drawings, an example aspect of the present disclosure will be described. FIG. 1 is a block diagram showing a configuration of a determination apparatus 10 according to an example aspect of the present disclosure. The determination apparatus 10 is a determination apparatus that determines the type of paint applied to an object. Specific examples of the determination apparatus 10 may be, but not limited thereto, an information processing apparatus such as a server, a Personal Computer (PC) or the like.

The object to be determined includes, for example, a vehicle such as an automobile. The type of the paint includes paint mixed with a light reflective material (hereinafter this paint will be referred to as "mixed paint") and paint in which the light reflective material is not mixed (hereinafter this paint will be referred to as "non-mixed paint"). The light reflective material includes a substance having glossiness that is glossier than the paint mixed with the light reflective material and this substance includes, for example, a metal such as aluminum having glossiness or a mineral such as mica having glossiness. The color of the mixed paint is, for example, pearl or metallic. The color of non-mixed paint is, for example, solid.

The determination apparatus 10 acquires a plurality of captured images of the painted object from an image capturing apparatus. The image capturing apparatus successively captures images of the painted object in a state in which the positional relation between the object and the image capturing apparatus is changing, thereby generating a plurality of captured images of the object that are continuous in time. When, for example, the painted object is moved by a carrier device such as a conveyor belt, the image capturing apparatus installed in a predetermined position successively captures images of the object, thereby being able to generate the captured images. Further, the captured images may be generated by successively capturing images of the object by the image capturing apparatus while changing the position of the image capturing apparatus in a state in which the painted object is arranged in a predetermined position. Further, the captured images may be generated by successively capturing images of the object by the image capturing apparatus while changing the position of the image capturing apparatus in a state in which the painted object is moving.

The determination apparatus 10 includes an arithmetic device 100, a communication interface (I/F) 110, and a storage apparatus 120. The arithmetic device 100 is an arithmetic device such as a Central Processing Unit (CPU) or a Micro Processing Unit (MPU). The arithmetic device corresponds to computer. The arithmetic device 100 reads out a determination program from the storage apparatus 120 and executes the determination program, thereby executing a determination method for determining the type of the paint applied to the object. The determination program includes a color tone change unit 101, a dividing unit 102, an associating unit 103, a luminance difference calculation unit 104, and a determination unit 105.

The color tone change unit 101 is a program module that changes the color tone of the captured images of the painted object. Specifically, the color tone change unit 101 changes the color tone of the captured images from color to grayscale when the color tone of the captured images is color. When the color tone of the captured images is grayscale, the color tone change unit 101 does not change the color tone of the captured images.

Figure 2:
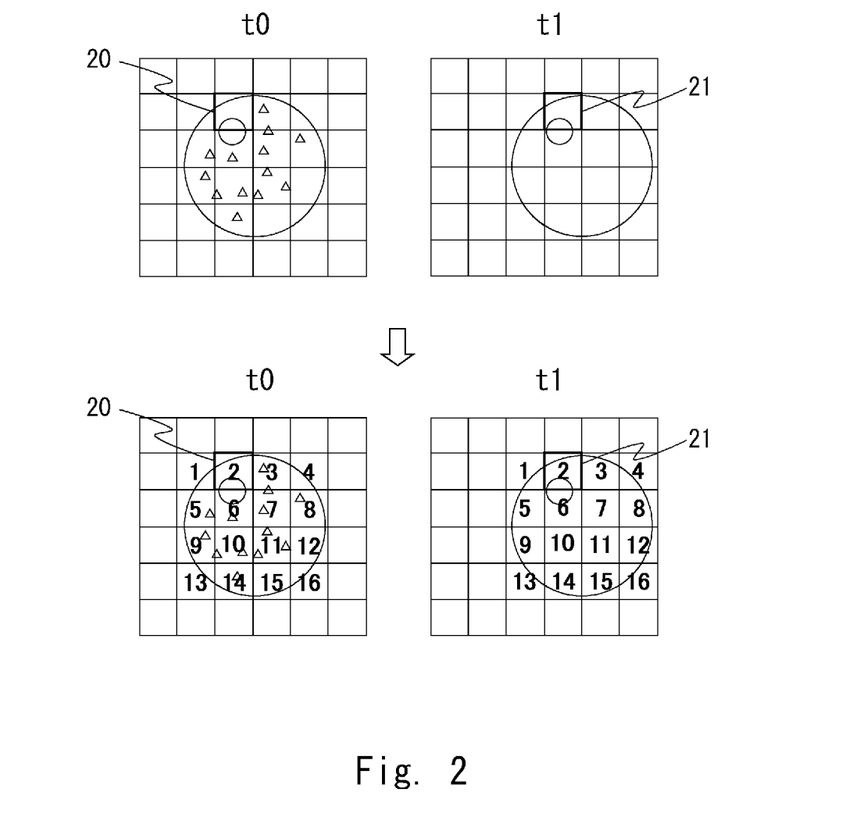
FIG. 2 is a diagram showing the concept of association processing according to an example aspect of the present disclosure.

The dividing unit 102 is a program module that divides the captured image of the painted object into a plurality of image areas. As shown in FIG. 2, the dividing unit 102 divides the captured image into image areas, each having a desired size. While one captured image is divided into 36 image areas in the example shown in FIG. 2, the number of image areas is not limited thereto.

The associating unit 103 is a program module that executes association processing for associating the plurality of image areas divided by the dividing unit 102 among the plurality of captured images. Specifically, the associating unit 103 collates image areas of two captured images that are continuous in time and associates the respective image areas of these captured images based on the position of the image areas that match each other. Details of the association processing will be described later with reference to FIG. 6.

The luminance difference calculation unit 104 is a program module that calculates a luminance difference between a maximum luminance value and a minimum luminance value in each of the image areas associated by the associating unit 103. The luminance difference calculation unit 104 analyzes the luminance values of the respective image areas that are associated and specifies the maximum luminance value and the minimum luminance value of the each of the image areas. Next, the luminance difference calculation unit 104 is able to calculate the luminance difference of each of the image areas by subtracting the minimum luminance value from the maximum luminance value.

Figure 3:
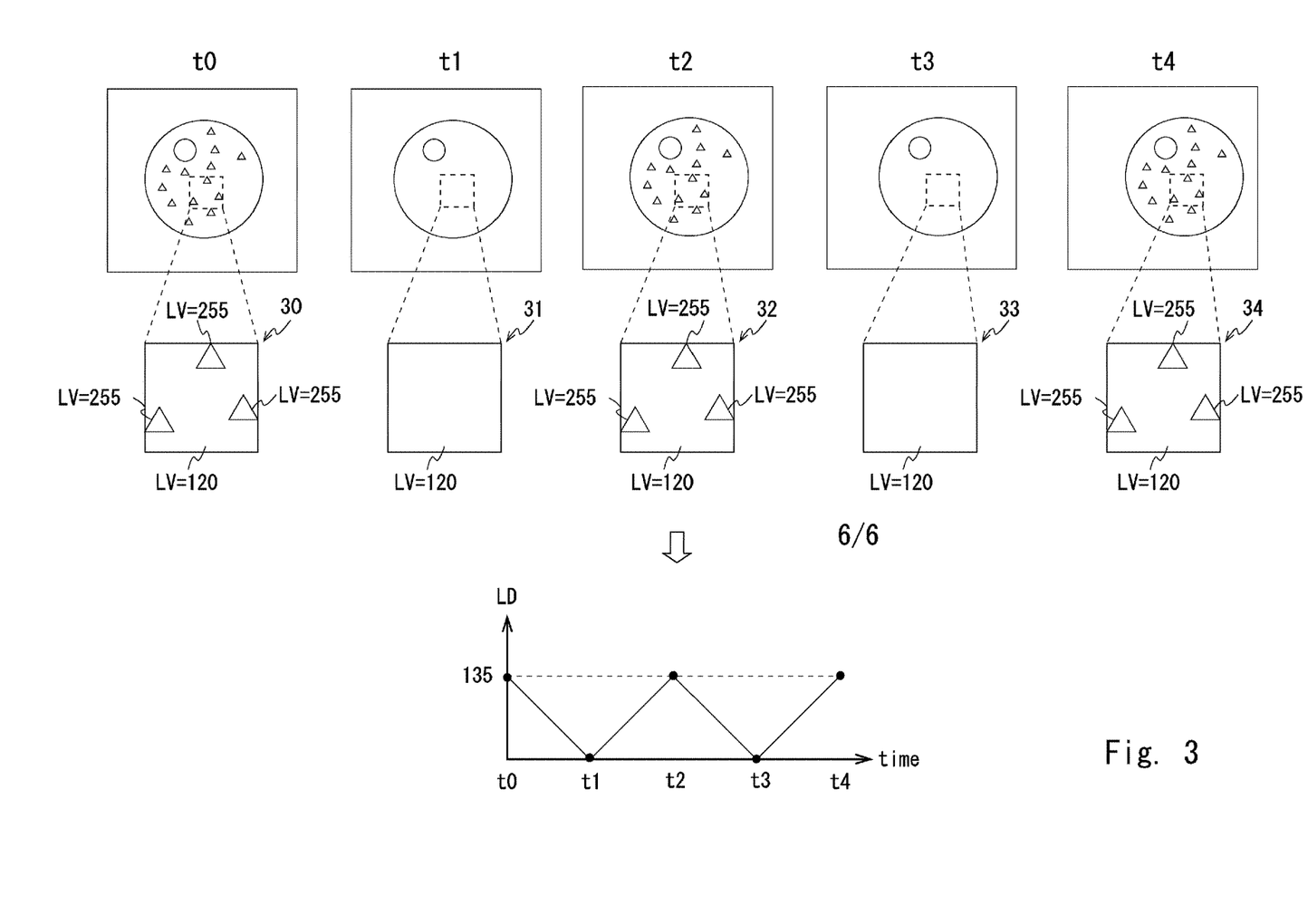
FIG. 3 is a diagram showing the concept of a method of calculating a luminance difference according to an example aspect of the present disclosure.

In the example shown in FIG. 3, image areas 30-34 of the captured images identified at time "t0"-"t4" are associated. In this example, the maximum luminance value LV and the minimum luminance value LV of each of the image areas 30, 32, and 34 of the captured images identified at time "t0", "t2", and "t4" are "255" and "120", respectively. In this case, the luminance difference LD of the image areas 30, 32, and 34 is "135". On the other hand, the maximum luminance value LV and the minimum luminance value LV of each of the image areas 31 and 33 of the captured image identified at time "t1" and time "t3" are both "120". In this case, the luminance difference LD of the image areas 31 and 33 is "0". The changes in the luminance differences LD of the image areas 30-34 can be expressed as shown in the graph in FIG. 3. Note that the luminance differences LD are not limited to the two values "0" and "135" and may be a value between "0" and "135" by reducing image-capturing intervals by the image capturing apparatus.

The determination unit 105 is a program module that determines the type of the paint applied to the object based on changes in the luminance differences in the plurality of image areas associated among the plurality of captured images that are continuous in time. In this embodiment, the determination unit 105 can be achieved as a trained model. The trained model is able to perform learning using, as training data, the information indicating the luminance difference of each image area associated among the plurality of captured images that are continuous in time and the information indicating the type of the paint applied to the object expressed in the respective image areas.

Figure 4:
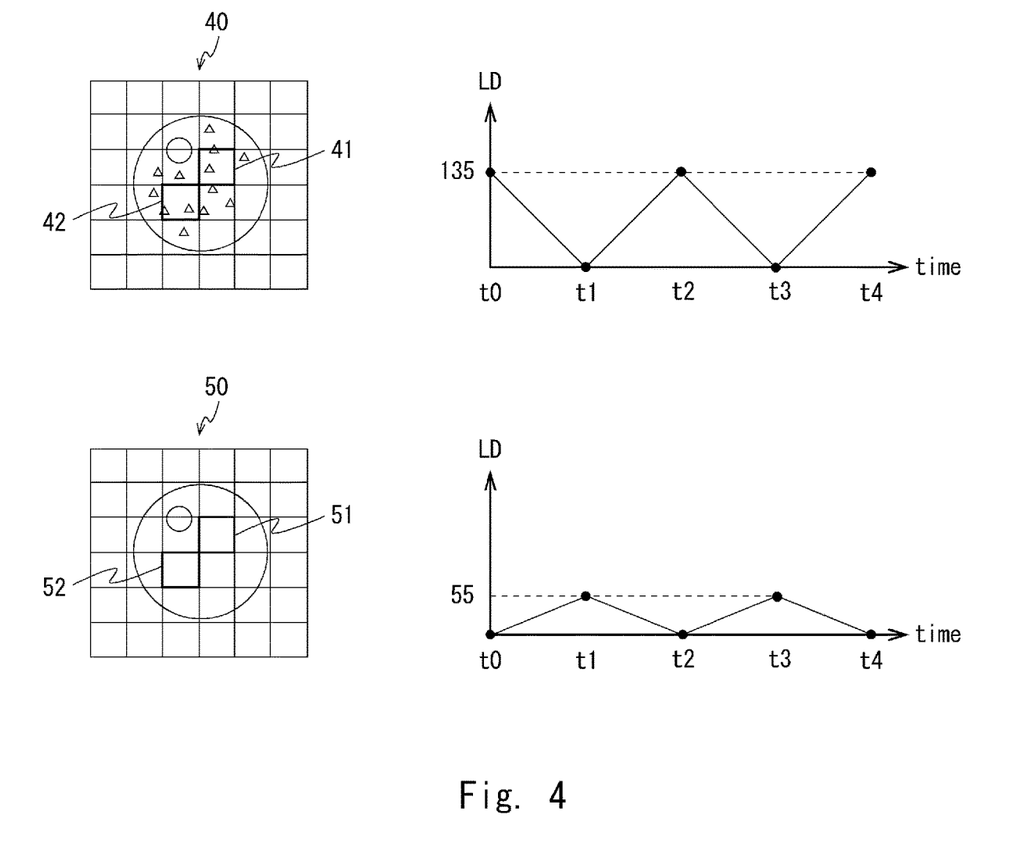
FIG. 4 is a diagram showing one example of changes in the luminance difference of a captured image of an object based on the type of paint.

FIG. 4 is a diagram showing a captured image 40 of the object to which the mixed paint has been applied, a captured image 50 of the object to which the non-mixed paint has been applied, and changes in the luminance differences LD of the image areas of these captured images. As shown in FIG. 4, the degree of the changes in the luminance difference LD of image areas 41 and 42 of the captured image 40 is larger than the degree of the changes in the luminance difference LD of image areas 51 and 52 of the captured image 50. That is, the degree of the change of the luminance difference LD in the mixed paint becomes larger than that in the non-mixed paint. As described above, the luminance difference in the respective image areas of the captured image of the painted object and the type of the paint applied to the object correlate with each other.

Upon receiving the information indicating the luminance differences of the plurality of image areas associated among the plurality of captured images that are continuous in time, the trained model outputs information indicating the type of the paint applied to the object. Specifically, when the information indicating the luminance differences in the plurality of image areas associated among the plurality of captured images of the object to which the mixed paint is applied has been input into the trained model, this model output information indicating the mixed paint. Further, when the information indicating the luminance differences in the plurality of image areas associated among the plurality of captured images of the object to which the non-mixed paint is applied has been input into the trained model, this model output information indicating the non-mixed paint.

The communication I/F 110 is an apparatus that communicates data between the determination apparatus 10 and an external apparatus. Upon receiving the captured image of the object to be determined from the external apparatus, the communication I/F 110 stores the captured image in the storage apparatus 120. The storage apparatus 120 is a storage apparatus that stores various kinds of data such as a determination program according to an example aspect of the present disclosure, a plurality of captured images of the painted object etc.

Figure 5:
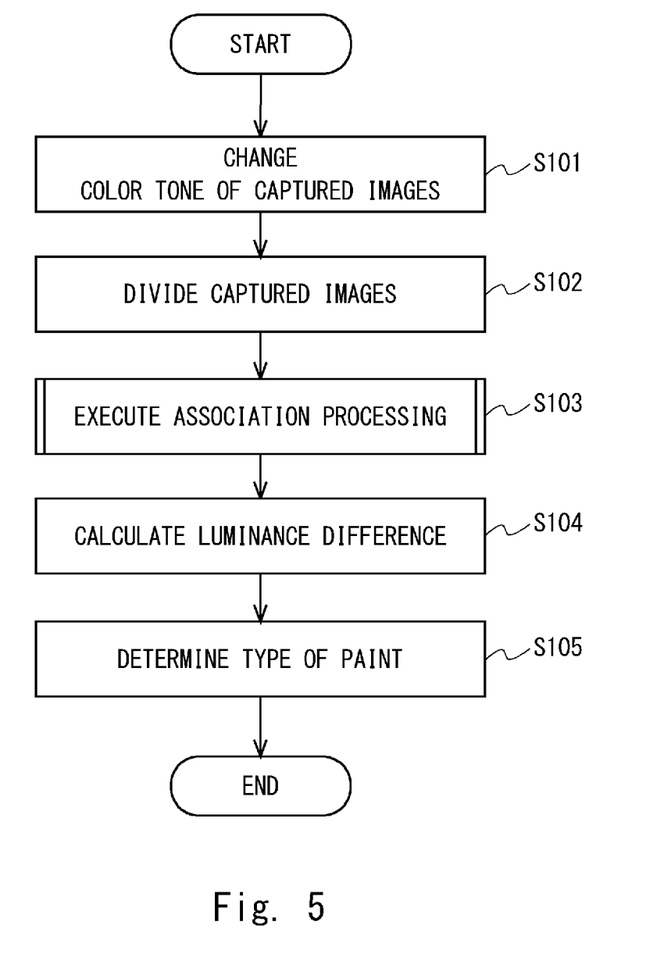
FIG. 5 is a flowchart showing one example of processing executed by a determination apparatus according to an example aspect of the present disclosure.

FIG. 5 is a flowchart showing one example of processing executed by the determination apparatus 10. In Step S101, the color tone change unit 101 of the determination apparatus 10 acquires a plurality of captured images of the painted object from the storage apparatus 120 and changes the color tone of these captured images from color to grayscale. Note that the processing of changing the color tones can be omitted when the color tone of the captured image stored in the storage apparatus 120 is grayscale.

In Step S102, the dividing unit 102 divides each of the captured images whose color tones are grayscale into a plurality of image areas. In Step S103, the associating unit 103 executes association processing using a plurality of captured images. In Step S104, the luminance difference calculation unit 104 calculates the luminance differences between the maximum luminance values and the minimum luminance values of the respective image areas that have been associated. In Step S105, the determination unit 105 determines the type of the paint applied to the object based on the changes in the luminance differences in the associated plurality of image areas, and the processing in FIG. 5 is ended.

Figure 6:
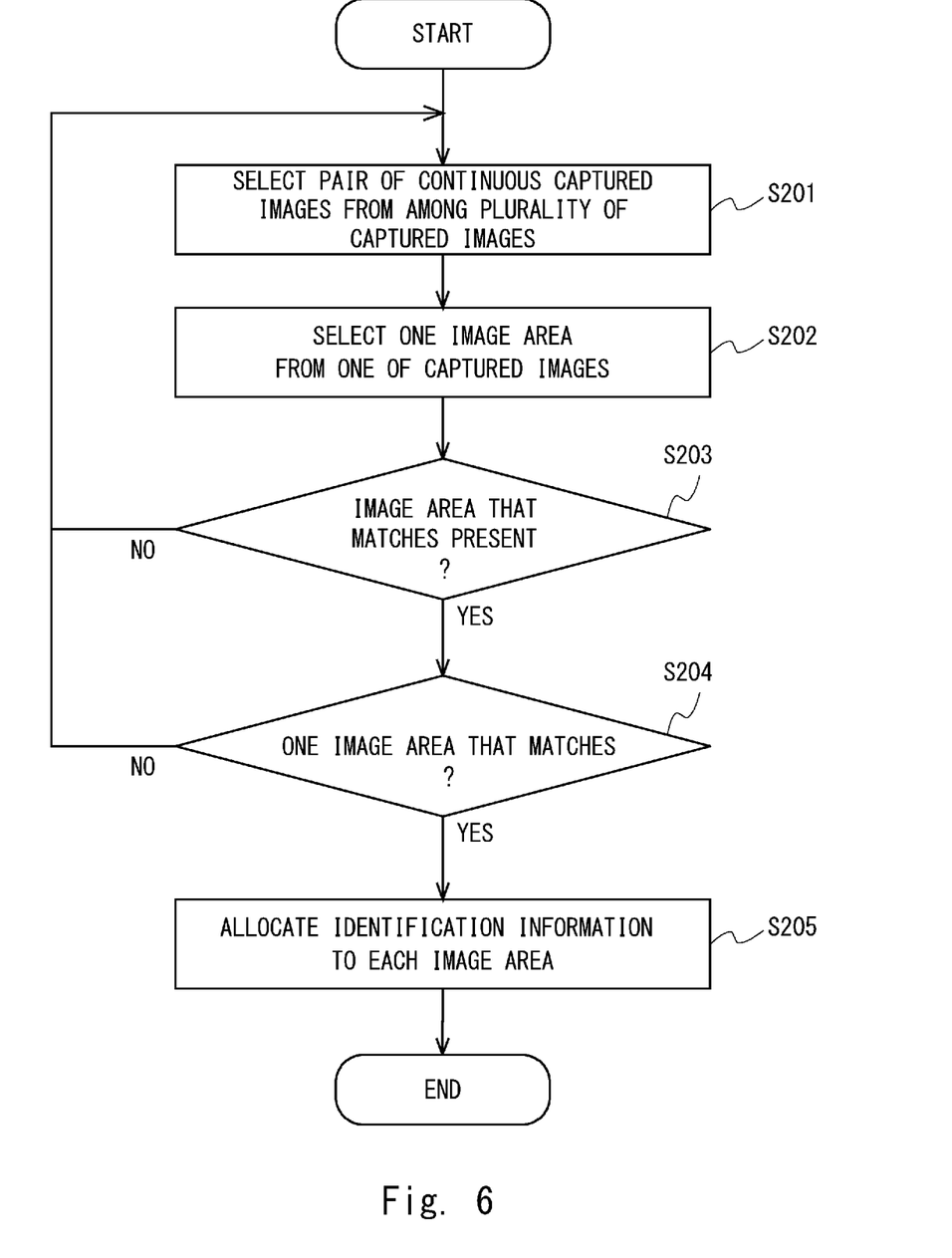
FIG. 6 is a flowchart showing one example of association processing according to an example aspect of the present disclosure.

FIG. 6 is a diagram showing one example of the association processing executed by the associating unit 103. In Step S201, the associating unit 103 selects a pair of captured images that are continuous in time from among the plurality of captured images. As shown in FIG. 2, for example, the associating unit 103 selects a captured image identified by "t0" and a captured image identified by "t1". In another embodiment, three or more captured images that are continuous in time may be selected.

In Step S202, the associating unit 103 selects one image area from one of the captured images. As shown in FIG. 2, for example, the associating unit 103 selects an image area 20 from the captured image identified by "t0". In this embodiment, the associating unit 103 selects the image area in which the painted object is shown.

In Step S203, the associating unit 103 determines whether or not an image area that matches one image area that has been selected is present in another captured image using an image collation method such as pattern matching. When there is no image area that matches one image area that has been selected (NO), the processing returns to Step S201. On the other hand, when there is an image area that matches one image area that has been selected (YES), the processing branches to Step S204.

In Step S204, the associating unit 103 determines whether or not there is only one image area, in the other captured image, that matches one image area that has been selected. When there is a plurality of image areas that match in the other captured image (NO), the processing returns to Step S201. On the other hand, when there is only one image area that matches in the other captured image (YES), the processing branches to Step S205.

In Step S205, the associating unit 103 allocates the identification information of each of the image areas to each of the image areas of the both captured images based on one image area that has been selected and the position of the image area that matches the selected image area, and the processing shown in FIG. 6 is ended. In the example shown in FIG. 2, for example, the associating unit 103 allocates identification information "1"-"16" to the respective image areas of the captured image identified by time "t0" and the respective image areas of the captured image identified by time "t1" based on one image area 20 that has been selected and the position of an image area 21 that matches the selected image area. Accordingly, each of the image areas in which the object to be determined is shown is associated. The associating unit 103 executes the processing of FIG. 6 on the whole pair of captured images that are continuous in time included in the plurality of captured images.

In the aforementioned embodiment, the determination apparatus 10 acquires a plurality of captured images of the object to be determined successively captured by the image capturing apparatus in a state in which the positional relation between the object to be determined and the image capturing apparatus is changing via the communication I/F 110. Next, the dividing unit 102 divides each of the plurality of captured images that are continuous in time into a plurality of image areas and the associating unit 103 associates the plurality of divided image areas among the plurality of captured images that are continuous in time. Then the luminance difference calculation unit 104 calculates the luminance differences between the maximum luminance values and the minimum luminance values in the respective image areas that have been associated, and the determination unit 105 determines the type of the paint applied to the object to be determined based on the changes in the luminance differences in the associated plurality of image areas.

As described above, the determination apparatus 10 determines the type of the paint applied to the object using the plurality of captured images of the object captured in a state in which the positional relation between the object to be determined and the image capturing apparatus is changing, whereby the determination apparatus 10 is able to determine the type of the paint applied to a wide range of the object to be determined.

Further, the changes in the luminance differences in the associated plurality of image areas in the mixed paint having glossiness are larger than those in the non-mixed paint. Therefore, by capturing images of this object in a state in which the positional relation between the object to be determined and the image capturing apparatus is changing, it is possible to capture the changes in the luminance difference as feature amounts. The determination apparatus 10 determines the type of the paint applied to the object to be determined using the aforementioned captured images, whereby it is possible to determine whether the type of the paint applied to the object is mixed paint or non-mixed paint.

In another embodiment, when the determination unit 105 of the determination apparatus 10 determines the type of the paint applied to the object, it may be determined that the paint applied to the object is mixed paint when the changes in the luminance differences are equal to or larger than a predetermined threshold, and it may be determined that the paint applied to the object is non-mixed paint when the changes in the luminance differences are smaller than the predetermined threshold. The predetermined threshold may be a value between a representative value of changes in the luminance differences of the mixed paint in a state in which it is applied to the object and a representative value of changes in the luminance differences of the non-mixed paint in a state in which it is applied to the object.

Further, in another embodiment, the determination apparatus 10 may determine the type of the paint applied to the object to be determined and the color of the paint using the captured color images without changing the color tone of the captured color images. In this case, the trained model is able to perform learning using, as training data, information indicating the luminance difference of each image area associated among a plurality of captured color images that are continuous in time, the information indicating the type of the paint applied to the object expressed in the respective image areas, and the information indicating the color of the paint.

In this embodiment, when information indicating the luminance difference of the plurality of image areas associated among the captured images of the plurality of colors of the object to which the mixed paint has been applied has been input into the trained model, this model is able to output information indicating the mixed paint and information indicating the color of the paint. When, for example, information indicating the luminance difference of the plurality of image areas associated among the plurality of captured color images of the object to which red mixed paint has been applied has been input into the trained model, this model output information indicating the mixed paint and information indicating that the color of the paint is red. When information indicating the luminance difference of the plurality of image areas associated among the plurality of captured color images of the object to which blue mixed paint has been applied has been input into the trained model, this model output information indicating the mixed paint and information indicating that the color of the paint is blue.

Further, when information indicating the luminance difference of the plurality of image areas associated among the plurality of captured color images of the object to which the non-mixed paint has been applied has been input into the trained model, this model is able to output information indicating the non-mixed paint. When, for example, information indicating the luminance difference of the plurality of image areas associated among the plurality of captured color images of the object to which white non-mixed paint has been applied has been input into the trained model, this model output information indicating the non-mixed paint and information indicating that the color of the paint is white. When information indicating the luminance difference of the plurality of image areas associated among the plurality of captured color images of the object to which yellow non-mixed paint has been applied has been input into the trained model, this model output information indicating the non-mixed paint and information indicating that the color of the paint is yellow.

Further, while one apparatus executes the color tone change unit 101, the dividing unit 102, the associating unit 103, the luminance difference calculation unit 104, and the determination unit 105 in the aforementioned embodiment, a plurality of apparatuses may execute these program modules in another embodiment. For example, one apparatus may execute the color tone change unit 101, the dividing unit 102, the associating unit 103, and the luminance difference calculation unit 104 and another apparatus may execute the determination unit 105.

Further, while the arithmetic device 100 executes the determination program in the aforementioned embodiment, an integrated circuit such as a Field-Programmable Gate Array (FPGA) or an Application Specific Integrated Circuit (ASIC) may execute the determination program in another embodiment. These integrated circuits correspond to computer.

In the above examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), compact disc read only memory (CD-ROM), CD-R, CD-R/W, and semiconductor memories (such as mask ROM, Programmable ROM (PROM), Erasable PROM (EPROM), flash ROM, RAM, etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A determination method for determining the type of paint applied to an object, the method comprising:
acquiring a plurality of captured images of the object successively captured by an image capturing apparatus in a state in which a positional relation between the object and the image capturing apparatus is changing;
dividing each of the plurality of captured images that are continuous in time into a plurality of image areas;
associating the plurality of divided image areas among the plurality of captured images that are continuous in time;
calculating a luminance difference between a maximum luminance value and a minimum luminance value in each of the image areas that have been associated; and
determining the type of the paint applied to the object based on changes in the luminance differences in the plurality of image areas associated among the plurality of captured images that are continuous in time.

2. The determination method according to claim 1, wherein
the type of the paint includes paint mixed with a light reflective material and paint in which the light reflective material is not mixed, and
it is determined, in the determination of the type of the paint, whether the paint applied to the object is the paint mixed with the light reflective material or the paint in which the light reflective material is not mixed.

3. The determination method according to claim 1, wherein
the determination of the type of the paint is performed using a trained model,
the trained model performs learning, as training data, information indicating the luminance differences in respective image areas associated among the plurality of captured images that are continuous in time and information indicating the type of the paint applied to the object expressed in the image areas, and
the trained model determines the type of the paint applied to the object using the information indicating the luminance differences of the associated plurality of image areas.

4. The determination method according to claim 2, wherein
in the determination of the type of the paint,
it is determined that the paint applied to the object is the paint mixed with the light reflective material when the changes in the luminance differences are equal to or larger than a predetermined threshold, and
it is determined that the paint applied to the object is the paint in which the light reflective material is not mixed when the changes in the luminance differences are smaller than the predetermined threshold.

5. A determination apparatus configured to determine the type of paint applied to an object, the determination apparatus comprising:
a dividing unit configured to divide each of a plurality of captured images of the object that have been successively captured by an image capturing apparatus in a state in which the positional relation between the object and the image capturing apparatus is changing into a plurality of image areas;
an associating unit configured to associate the plurality of divided image areas among the plurality of captured images that are continuous in time;
a luminance difference calculation unit configured to calculate a luminance difference between a maximum luminance value and a minimum luminance value in each of the image areas that have been associated; and
a determination unit configured to determine the type of the paint applied to the object based on changes in the luminance differences in the plurality of image areas associated among the plurality of captured images that are continuous in time.

6. The determination apparatus according to claim 5, wherein
the type of the paint includes paint mixed with a light reflective material and paint in which the light reflective material is not mixed, and
the determination unit determines whether the paint applied to the object is the paint mixed with the light reflective material or the paint in which the light reflective material is not mixed.

7. The determination apparatus according to claim 5, wherein
the determination unit is a trained model that performs learning using, as training data, information indicating the luminance differences in respective image areas associated among the plurality of captured images that are continuous in time and information indicating the type of the paint applied to the object expressed in the image areas, and the trained model determines the type of the paint applied to the object using the information indicating the luminance differences of the associated plurality of image areas.

8. The determination apparatus according to claim 6, wherein the determination unit determines that the paint applied to the object is the paint mixed with the light reflective material when the changes in the luminance differences are equal to or larger than a predetermined threshold, and the determination unit determines that the paint applied to the object is the paint in which the light reflective material is not mixed when the changes in the luminance differences are smaller than the predetermined threshold.

9. A non-transitory computer readable medium storing a determination program for determining the type of paint applied to an object, the program causing a computer to execute the following steps of:

acquiring a plurality of captured images of the object successively captured by an image capturing apparatus in a state in which a positional relation between the object and the image capturing apparatus is changing;

dividing each of the plurality of captured images that are continuous in time into a plurality of image areas;

associating the plurality of divided image areas among the plurality of captured images that are continuous in time;

calculating a luminance difference between a maximum luminance value and a minimum luminance value in each of the image areas that have been associated; and determining the type of the paint applied to the object based on changes in the luminance differences in the plurality of image areas associated among the plurality of captured images that are continuous in time.

10. The non-transitory computer readable medium according to claim 9, wherein the type of the paint includes paint mixed with a light reflective material and paint in which the light reflective material is not mixed, and the step of determining the type of the paint includes a step of determining whether the paint applied to the object is the paint mixed with the light reflective material or the paint in which the light reflective material is not mixed.

* * * * *